June 23, 1964 H. S. FOTH 3,138,088
METHOD AND APPARATUS FOR DEWATERING SLURRIES
Filed May 12, 1961
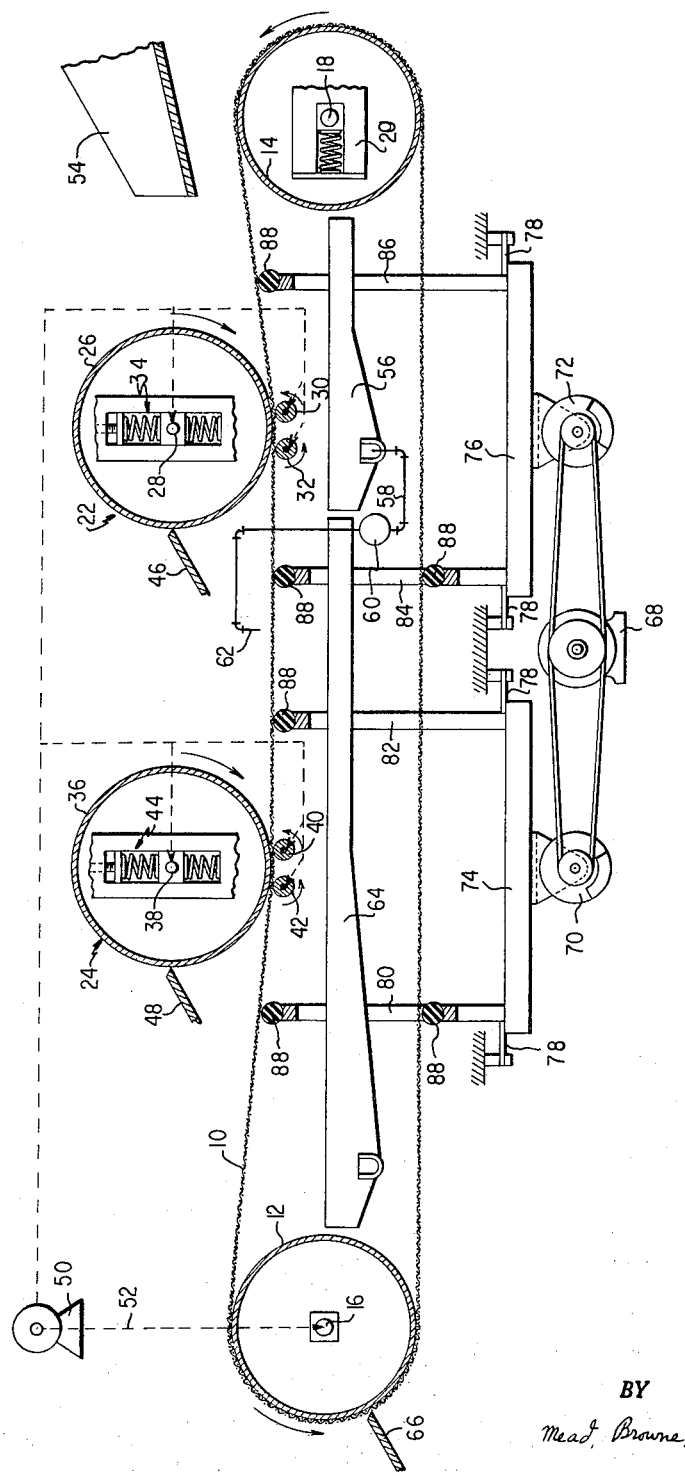
FIG. I
INVENTOR.
HERBERT S. FOTH
BY
Mead, Browne, Schuyler & Beveridge
ATTORNEYS 3,138,088
METHOD AND APPARATUS FOR
DEWATERING SLURRIES
Herbert S. Foth, Green Bay, Wis., assignor to International, Vibro Inc., a corporation of Wisconsin
Filed May 12, 1961, Ser. No. 109,570
7 Claims. (Cl. 100—37)

This invention relates to improvements in methods and apparatus for dewatering slurries containing solid particles of sizes which may vary within a given size range.

The present invention is in general directed to the problem of separating relatively small solid particles from a slurry. When the slurry to be dewatered contains any substantial amount of relatively large particles, the invention is employed in combination with some coarse separating means so that the particles handled by the methods and apparatus to be described below will vary within a size range having a predetermined upper limit.

Conventionally, slurries of the type with which the present invention is concerned are dewatered in a press filter operation in which a filter screen is employed to convey the slurry though a press assembly which expresses the filtrate through the screen and collects the solid particles upon the screen.

Generally, such processes are conducted on a reasonably large scale and hence the dewatering operation is established as a continuous process, usually employing an endless filter screen which is continuously advanced to carry the slurry through a pair of opposed press rolls which compress the slurry against the screen to express a filtrate. The primary problem encountered in such an operation involves the selection of the size of the screen mesh. In order to achieve the maximum of solid particles from the liquid of the slurry, the mesh of the screen must be selected to be small enough to prevent the smaller sized solid particles from passing though the screen during the pressing operation.

However, as a practical matter, the selection of the mesh size cannot be made merely by considering the size particles involved. This is because as the size of the openings of the screen mesh are reduced, thereby reducing the percentage of particles which theoretically can pass through the screen, the clogging characteristics of the screen increase. As the process is operated, particles of sizes smaller than the screen mesh begin to collect within the openings of the mesh due to adherence with other particles or merely by a bulking operation. The finer the screen mesh the more rapidly the openings in the mesh become clogged, thereby drastically reducing the rate at which the liquid portion of the slurry can be expressed through the screen. Particles of sizes larger than the screen mesh do not tend to become compacted within the screen itself, but rather remain upon the surface of the screen from which they may be readily removed by a scraping operation. However, the clogging of the screen by the smaller particles which collect within the openings themselves is extremely difficult to counter-act and usually requires a complete shutdown of the process to remove the solid particles from the screen.

Thus, as a practical matter, reduction of the size mesh to increase the efficiency of the dewatering operation by removing particles in the smaller size ranges must be weighed against the resulting decrease in the over-all efficiency of the operation due to increased clogging characteristics.

It is a primary object of the invention to provide a method and apparatus for dewatering slurries which is capable of achieving a high solid-liquid separation efficiency without a corresponding increase in the tendency of the filter element to become clogged.

It is another object of the invention to provide methods and apparatus for dewatering slurries by the use of a filter screen in which the tendency of smaller particles to collect within the openings of the screen mesh is greatly reduced.

Still another object of the invention is to provide methods and apparatus for dewatering slurries wherein particles varying in size within a given size range are collected on a filter screen in a manner such that the larger size particles are disposed in a layer adjacent the screen and the smaller size particles are disposed in a layer spaced from the screen.

Still another object of the invention it to provide apparatus capable of continuously dewatering slurries containing solid particles in which the shutdown time for cleaning of the filter element is minimized.

The foregoing, and other objects are achieved in a dewatering operation in which a slurry to be filtered is passed through a filter medium in the form of a filter screen by successively advancing the screen through two steps of pressing rolls. The mesh of the screen is selected in accordance with the size range of solid particles to be separated from the liquid so that the mesh of the screen is relatively coarse when considered in terms of conventional practice. Thus, during the first pressing operation, the expressed filtrate contains a relatively large percentage of solids, which, because of the coarseness of the screen mesh, readily pass through the filter screen. The size of the mesh of the screen is selected to be such that a cake of the larger size particles is formed upon the screen by the first pressing operation.

The screen, with the cake thereon is then advanced to a second pressing operation. Prior to the second pressing operation, the expressed filtrate of the first pressing operation is flowed onto the cake upon the screen. Thus, as the screen, cake and filtrate pass through the second pressing operation, the cake acts as a filter medium and thus acts to collect the smaller size particles which passed freely through the screen during the first pressing operation. It will be noted that the finer particles are thus primarily collected by the cake formed in the first operation and hence the tendency of the smaller solid particles to be collected within the screen mesh is drastically reduced.

Thus, after the second pressing operation, the solid particles collected by the screen and the cake may be readily scraped from the screen and, by making the screen endless, the process can be operated continuously for long periods of time without requiring shutdown to rejuvenate the filter screen. To further reduce the tendency of the screen to collect smaller particles within its mesh, the endless screen is subjected to a vibratory action during its transit around the endless path. The vibratory action tends to shake from the screen any of the smaller particles not positively restrained against movement through the screen by direct engagement with the screen itself.

Other objects and advantages will become apparent by reference to the following specification and to the drawings.

In the drawings:

FIG. 1 is a side elevational view, partially diagrammatic and partially in section, of an apparatus for dewatering slurry in accordance with the present invention.

The apparatus disclosed in the drawing includes an endless filter screen 10 which is operatively trained about end rolls 12 and 14 which are supported by conventional means, not shown in detail, for rotation about spaced parallel horizontal axis represented in FIG. 1 by the shafts 16 and 18 respectively. In the structure shown in FIG. 1, shaft 16 is rotatably supported at a fixed location while shaft 18 of end roll 14 is supported by means which include the take up adjustment indicated generally at 20 so that the tension on endless screen 10 may be regulated.

The upper run of screen 10 passes successively through operative relationship with a first roll press 22 and a second roll press 24. Roll presses 22 and 24 are similar in construction; roll press 22 including a relatively large diameter upper roll 26 mounted upon a rotatable shaft 28. The upper run of endless screen 10 passes beneath upper roll 26 in contact with the periphery of the roll and above a pair of horizontally spaced relatively small diameter lower rolls 30 and 32 which engage the underside of screen 10 at respective points spaced equidistant from the vertical plane containing the axis of shaft 28. Endless screen 10 thus is disposed between roll 26 and rolls 30 and 32 and thus, in advancing from right to left as viewed in FIG. 1, the upper run of screen 10 passes through two compression zones which are respectively represented by the respective "lines of contact" between the periphery of roller 30 with the periphery of roller 26 and between the periphery of roller 32 and the periphery of roller 26. Since screen 10 is disposed between roller 26 and rollers 30 and 32, rollers 30 and 32 are not in direct contact with the periphery of roller 26 and hence the term "line of contact" is employed in a generalized descriptive sense. The degree of pressure applied to the screen as it passes between roller 26 and the respective rollers 30 and 32 may be adjusted by the resilient mounting assembly 34 partially shown, which supports shaft 28 from the fixed frame of the machine, not shown.

Roll press assembly 24 is identical with roll press 22 and includes a relatively large diameter upper roll 36, supported upon a rotatable shaft 38, and lower rolls 40 and 42 respectively. A similar resilient mounting assembly 44 is employed to support shaft 38 from the machine frame. Each roll press assembly further includes a scraper blade such as 46 and 48 disposed to scrape particles from the respective peripheries of the upper rolls 26 and 36.

End roll 12 is employed as a drive roll to drive endless filter screen 10 in continuous movement along the indicated path in a direction such that the upper run of screen 10 moves from right to left as viewed in FIG. 1. End roll 12 and the various large and small diameter rolls of the respective roll presses 22 and 24 are driven from a common drive motor schematically illustrated at 50 through a synchronized drive train 52 so that the periphery of all of rolls 12, 26, 30, 32, 36, 40 and 42 move at the same speed as belt 10 so that no slippage occurs between screen 10 and any of the rolls contacted by the screen. End roll 14 acts merely as an idler roll.

Sludge or other material to be dewatered is fed onto the upper run of screen 10 from a trough 54 which is located to flow the sludge or other material onto the upper side of the upper run of filter screen 10 at a point between end roll 14 and the first roll press 22. The mixture to be dewatered may be considered either to be thick enough to keep from flowing over the opposite sides of screen 10 or, alternatively, side walls (not shown) may be disposed in sliding contact with the upper run of screen 10 so that the screen and side walls form a trough to contain the slurry.

Slurry to be dewatered flowed onto the screen from trough 54 is carried by the screen into the first compression zone at which screen 10 passes between upper roll 26 of roll press 22 and the first lower roll 30. Because upper roll 26 is of a relatively large diameter, the angle of ingress between the periphery of roll 26 and the upper side of the upper run of screen 10 is relatively small, and thus the slurry supported upon the upper side of screen 10 is picked up and drawn into the nip between the screen and roll 26, regardless of its thickness. Because the diameter of roll 30 is relatively small, a relatively large angle is present on each side of the point of contact between the periphery of roll 30 and the bottom side of screen 10 so that an ample outlet for the filtrate squeezed from the slurry by its passage through the compression zone between rollers 26 and 30 can easily flow from the screen, thus minimizing backward flow of liquid over the surface of slurry approaching the nip between rolls 26 and 30.

Any flooding of the slurry which might occur during the passage of the slurry through the first compression zone of roll press 22 is taken care of by the second lower roll 32 which again defines a zone of compression through which the at least partially dewatered slurry is passed before it leaves the first roll press.

Liquid filtrate expressed through screen 10 during its passage through the first roll press is collected in a pan 56 mounted below roll press 22.

Ordinarily, previous roll presses employed for dewatering a slurry employ a system which includes a single roll press, and the foregoing description of the passage of the slurry and screen through roll press 22 would be a complete description of a dewatering roll press operation.

In the ordinary system which involves a single roll press employed with an endless filter screen, a compromise must be made in the selection of the mesh of the endless screen. Since the object of the operation of the roll press is to dewater a slurry which will contain solid particles of sizes varying within a given size range, the size of the screen mesh should, at first glance, be chosen to be small enough so that the number of particles which pass through the screen will be a relatively small percentage of the total amount of solids contained in the slurry. However, as a practical matter, the smaller the size of the mesh, the greater is the tendency of the screen to clog, the clogging action resulting from the collection of solid particles within the screen openings so that they are not removed by a scraping operation. Thus, a screen having a mesh small enough to collect most of the particles usually have undesirable clogging characteristics, while a screen having a mesh large enough to avoid an undesirable amount of clogging passes an unduly large percentage of the solid particles.

To avoid the necessity of attempting to compromise on a mesh size because of the problem outlined above, the apparatus disclosed in the present application employs two roll presses 22 and 24. Passage of the screen through the first roll press 10 not only expresses a filtrate from the slurry, but also forms a cake of particles upon the screen. This is accomplished by choosing the size of the mesh of screen 10 to be a size large enough, in comparison with the size range of solid particles to be encountered in the slurry, to prevent undesirable clogging, while at the same time retaining a sufficient number of particles to form a cake of solid particles upon the screen as it passes through a roll press 22. Thus, the mesh size of the screen is chosen to be smaller than the sizes of the larger solid particles encountered, but larger than the smaller sizes of solid particles encountered. Since a slurry containing solid particles having sizes varying within a given size range usually does not contain a uniform distribution of particles of particular sizes within the size range, it is not possible to directly relate the mesh size of screen 10 to the size range of particles. The mesh size is chosen in accordance with the characteristics of the particular slurry to be large enough to prevent an undesirable amount of clogging while at the same time being small enough to assure that a cake is formed upon the screen by its passage through its first roll press 22.

The cake formed on the filter screen by its passage through the first roll press is utilized to supplement the screen as a filter media for the filtrate expressed from the slurry during the passage through the first roll press.

Returning now to FIG. 1, filtrate collected in pan 56, which, by virtue of the relatively coarse mesh of the screen, will include particles of sizes within the lower portion of the total particle size range, is conducted through an outlet conduit 58 and elevated by a pump 60 to be discharged onto the cake formed on screen 10 from an outlet 62 located above the upper end of screen 10 between roll presses 22 and 24. Filtrate from pan 56 is thus flowed onto the cake formed on screen 10 by the passage of screen through roll press 22. This filtrate and the cake are then conducted through second roll press 24 which compresses the cake and filtrate against screen 10 to express a second filtrate which is collected in a second pan 64. During the passage of the filtrate, cake and screen 10 through the compression zones of the second roll press 24, the expressed filtrate must flow not only through the mesh of screen 10, but also through the filter cake formed on the screen by the passage of the screen and slurry through the first roll press. Thus, the filter cake acts as a filter media and retains a large percentage of the smaller size particles.

From the second roll press 24, screen 10 passes around end roll 12 and a scraper 66 is employed to scrape the cake from the filter screen.

Basically, the dewatering action described above acts to form a layer of the larger particles on the upper surface of the screen and to then refilter the slurry to form a layer of smaller size particles retained substantially above or within the layer of larger size particles. Thus, the tendency of the smaller size particles to collect within the screen mesh at a location where they would not be operatively engaged by scraper 66 is minimized.

To further minimize the collection of a plurality of smaller particles within the openings of the screen mesh, the screen is subjected to a vibration to shake these particles free from the screen mesh. The vibrating assembly includes a drive motor 68 which is employed to drive two eccentric counterweights 70 and 72 in rotation. Counterweights 70 and 72 are mounted for rotation upon respective frames 74 and 76 which are supported from the fixed frame of the machine as by leaf spring elements 78. Each of frames 74 and 76 includes vertical upright members such as 80, 82, 84 and 86 which project upwardly from frames 74 and 76 beyond the opposite side of screen 10. Horizontal cross members such as 88 extend transversely across the respective upper end lower runs of screen 10 beneath the runs and in contact with the lower sides of the screen. Upon rotation of counterweights 70 and 72, their respective frames 74 are oscillated vertically to apply a vibratory force to the upper and lower runs of screen 10. This vibratory action shakes the solid particles which may collect within the openings of screen 10 free from the screen to minimize clogging of the screen.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. The method of dewatering a slurry having solid particles varying in size within a given size range comprising the steps of feeding said slurry onto a filter screen adapted to pass particles of sizes within the lower portion of said given size range and to retain particles of sizes within the upper portion of said given size range, compressing said slurry against said filter screen to express a first filtrate and to form a cake of particles upon said filter screen, flowing said first filtrate onto said cake, and subsequently compressing said filtrate and said cake against said screen to express a second filtrate.

2. The method defined in claim 1 including the step of continuously vibrating the screen.

3. A continuous method of dewatering a slurry having solid particles varying in size within a given size range comprising the steps of continuously feeding said slurry onto an endless filter screen adapted to pass particles of sizes within the lower portion of said given size range, continuously driving said endless screen in movement around a fixed endless path, compressing said slurry against said screen at a first point on said path to express the first filtrate and to form a cake of particles upon said filter screen, collecting said first filtrate and flowing said first filtrate onto the cake at a location beyond said first point, and compressing said first filtrate and said cake against said screen at a second point on said path beyond the location at which said first filtrate is flowed onto said cake.

4. The method defined in claim 3 including the step of continuously vibrating the screen.

5. Apparatus for dewatering a slurry containing solid particles varying in size within a given size range comprising an endless filter screen having a mesh size adapted to pass solid particles of a size within the lower portion of said given size range and to retain particles of a size within the upper portion of said given size range, means for supporting and continuously driving said screen around an endless path wherein said screen is advanced from a first point on said path to a second point on said path in a substantially horizontal position, means for flowing slurry to be dewatered onto said screen at said first point on said path, first press means at a first location on said path between said first point and said second point for pressing slurry against said screen to express a first filtrate through said screen and to form a cake of particles upon said screen as said screen is advanced past said first location, means for flowing said first filtrate onto said cake of particles at a second location on said path between said first location and said second point, and second press means at a third location on said path between said second location and said second point for pressing said first filtrate against said cake and said screen to express a second filtrate through said cake and said screen and to thicken said particles on said screen.

6. Apparatus for dewatering a slurry containing solid particles varying in size within a given size range comprising a pair of spaced roll presses, an endless filter screen having a mesh size adapted to pass the finer particles of a slurry to be dewatered and to retain the coarser particles, means for supporting and driving said screen around an endless path wherein one run of said screen is successively advanced through operative relationship with said roll presses, means for flowing slurry to be dewatered onto said endless screen to be carried by said screen in to operative relationship with the first of said roll presses, and means for collecting the filtrate expressed from said slurry by said first of said roll presses and flowing said filtrate onto the cake retained upon said screen after the expression of said filtrate by said first of said roll presses at a location between said pair of said roll presses.

7. Apparatus as defined in claim 6 including means for vibrating said screen.

References Cited in the file of this patent

UNITED STATES PATENTS

| | | |
|---|---|---|
| 450,094 | Black | Apr. 7, 1891 |
| 965,486 | Putt | July 26, 1910 |
| 1,301,532 | Allen | Apr. 22, 1919 |
| 2,592,490 | Thompson | Apr. 8, 1952 |
| 2,793,756 | Haltmeier | May 28, 1957 |